(No Model.)
J. F. WILSON.
TREE PROTECTOR.
No. 318,586. Patented May 26, 1885.
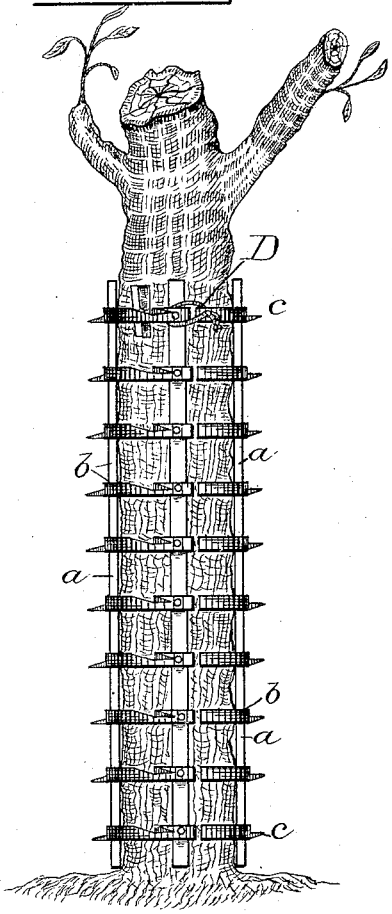
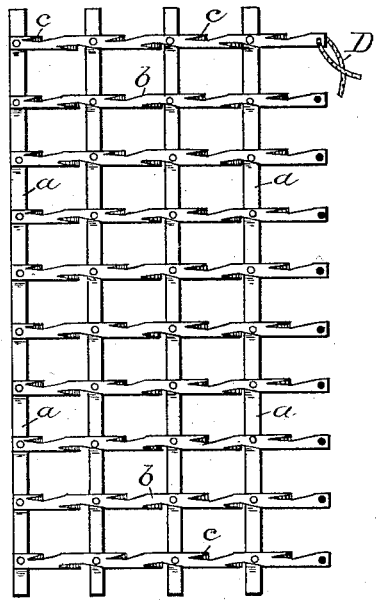
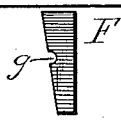
WITNESSES
INVENTOR
Jesse F. Wilson
Attorney

UNITED STATES PATENT OFFICE.

JESSE F. WILSON, OF TERRE HAUTE, INDIANA.

TREE-PROTECTOR.

SPECIFICATION forming part of Letters Patent No. 318,586, dated May 26, 1885.

Application filed February 4, 1885. (No model.)

*To all whom it may concern:*

Be it known that I, JESSE F. WILSON, a citizen of the United States, residing at Terre Haute, in the county of Vigo and State of Indiana, have invented certain new and useful Improvements in Tree-Protectors; and I do hereby declare the following to be a full, clear, and exact description of the invention, such as will enable others skilled in the art to which it appertains to make and use the same.

My invention relates to tree-protectors; and it consists of an arrangement of a series of flexible metal bands provided with barbs and fastening devices, and secured to slats in such a manner as to adapt the structure for transportation in connection with keys of a peculiar form to be used with the protector when set up around a tree to regulate the tension of the flexible bands, and to aid in holding the protector against displacement.

My invention is illustrated in the accompanying drawings, in which Figure 1 is a view in elevation of a section of the protector ready for transportation; Fig. 2, a perspective view of the same when applied to a tree, and Fig. 3 a detail view of the tension-key.

In the drawings, the parts *a* are the slats, and *b* the bands, secured by nails or bolts to the slats and preferably in parallel rows and at right angles to the slats. The bands or strips *b* are made of sheet metal, and have barbs *c* cut in their sides, which turn outwardly from the slats.

D are wires in the ends of the bands to fasten them together when the protector is placed around a tree. As shown in Fig. 1, the protector is in form for transportation, and any number of such sections of any desired length may be placed in layers, baled, and shipped.

When it is desired to place the protector in proper position around a tree, one or more sections, or less than a section, may be taken, according to the size of the tree, and then bent around the tree until it is completely enveloped, the slats being stood on end in or on the ground around the foot of the tree and resting against it. The ends of the bands are then secured by the wires D, or some equivalent device.

F is a tension-key provided with a slot or recess, *g*, and of the form shown, which, after the protector is put in place around the tree, is slipped between the tree and upper band, the band coming within the slot *g*, where it is then held against displacement and the protector maintained in position against the wind or other force and abrasion of the bark prevented. The keys, being rather loosely inserted, can be easily removed and replaced by smaller ones as the tree grows. The wooden slats can be of any length, be put as close together or as far apart as desired, and should be of sufficient thickness to prevent the barbs from touching the bark. By this construction a cheap, durable, and substantial protector is had, of great convenience in transporting, and in putting quickly and securely in place.

I am aware that barbed wire has been used for tree-protectors wound spirally around the tree and secured thereto by slotted bands and bolts; also, that straight slats have been used nailed to the tree; also, that slats have been held to trees by straps being wound around them; but

What I claim, and desire to secure by Letters Patent, is—

A flexible portable tree-protector consisting of a section of slats and a series of flexible metal bands permanently secured to the outer surface of said slats and provided with barbs and with fastening devices for connecting the ends of the bands, in combination with removable keys for regulating the tension of the bands and holding the protector against displacement, substantially as described.

In testimony whereof I affix my signature in presence of two witnesses.

JESSE F. WILSON.

Witnesses:
JOHN H. MILLER,
FRED A. ROSS.